3,440,212
POLY-α-OLEFIN COMPOSITIONS HAVING IMPROVED STABILITY

Clarence E. Tholstrup, Kingsport, Tenn., assignor to Eastman Kodak Company, Rochester, N.Y., a corporation of New Jersey
No Drawing. Continuation of abandoned application Ser. No. 508,850, Nov. 19, 1965, which is a continuation of application Ser. No. 193,590, May 9, 1962. This application Aug. 30, 1966, Ser. No. 576,159
Int. Cl. C08f 45/58
U.S. Cl. 260—45.8          10 Claims This application is a continuation of application Ser. No. 508,850, now abandoned, which in turn is a continuation of U.S. patent application Ser. No. 193,590 filed May 9, 1962, now abandoned for "Poly-α-Olefin Compositons Having Improved Stability," which is a continuation-in-part of U.S. patent application, Ser. No. 860,667, filed Dec. 21, 1959, now abandoned for "Poly-α-Olefin Compositions Containing Dialkyl 3,3'-Thiodipropionates and Thiobisphenols."

This invention relates to new poly-α-olefin compositions. Preferred embodiments of the invention relate to polyethylene and polypropylene compositions having improved stability at elevated temperatures to oxidative degradation.

Poly-α-olefins such as polyethylene, polypropylene and the like are commonly subjected to elevated temperatures in the course of their processing into useful items of commerce. Such processing methods as rolling, injection molding, extrusion and the like at elevated temperatures usually result in oxidative degradation of the polymer. In addition, many uses of poly-α-olefins, such as in electrical insulation and the like, often times expose the poly-α-olefin at elevated temperatures. To minimize oxidative deterioration in poly-α-olefins, anti-oxidants or stabilizers are often times incorporated therein.

It is an object of this invention to provide new poly-α-olefin compositions having improved resistance to thermal degradation.

It is another object of this invention to provide new synergistic combinations of stabilizers for poly-α-olefin compositions.

It is also an object of this invention to provide novel polypropylene compositions containing synergistic combinations of compounds that improve the stability of the polypropylene compositions against deterioration resulting from exposure to elevated temperatures and ultraviolet light.

Other objects of the invention will be apparent from the description and claims that follow.

The present invention comprises poly-α-olefin compositions having incorporated therein a stabilizer combination of a diester of thiodialkanoic acid, a thiobisphenol and a phenyl salicylate.

The diesters of thiodialkanoic acid comprising the present stabilizer combinations having the following formula:

$$S[(CH_2)_x\overset{O}{\overset{\|}{C}}OR]_2$$

wherein $x$ is an integer of 2 or 3 and R is an alkyl-radical having at least 4 and generally 4 to 22 carbon atoms, with 8 to 18 carbon atoms being preferred. Particularly effective stabilizer addenda are dilauryl 4,4'-thiodibutyrate and dilauryl 3,3'-thiodipropionate. However, any diester of thiodialkanoic acid as described above can be employed in the present stabilizer combination including the butyl, amyl, hexyl, heptyl, octyl, nonyl, decyl, tridecyl, myristyl, pentadecyl, cetyl heptadecyl octadecyl eicosyl, and docosanyl diesters of 3,3'-thiodipropionic acid or 4,4'-thiodibutyric acid.

A wide variety of thiobisphenols can be utilized in the present stabilizer combinations. Combinations of diesters of 3,3'-thiodipropionate and thiobisphenols described in my copending U.S. application No. 193,590 filed May 9, 1962, can be part of the present synergistic stabilizer combinations. Illustrative suitable thiobisphenols have the following formulas:

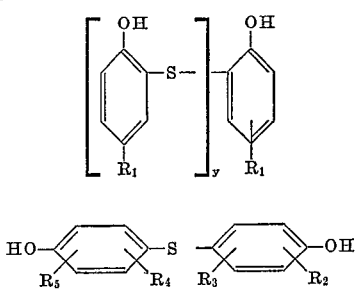

or

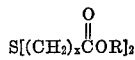

wherein $y$ is an integer of 1 to 6; and wherein $R_1$, $R_2$, $R_3$, $R_4$, and $R_5$ are hydrocarbon radicals having 1 to 22 carbon atoms including benzyl radicals, cyclohexyl radicals, 1-alkylbenzyl radicals, 1-alkylcyclohexyl radicals, and more usually, alkyl radicals having 1 to 18 and preferably 1 to 8 carbon atoms. $R_2$ and $R_4$ are desirably tertiary alkyl radicals having 4 to 18 carbon atoms in the ortho positions with respect to the hydroxyl radicals. Typical thiobisphenols of the latter generic formula set out above are

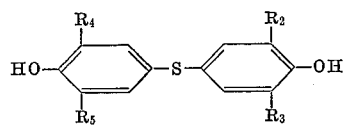

and

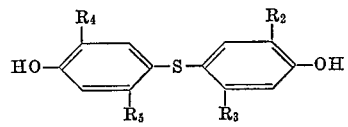

Illusrative thiobisphenols of the invention include:

4,4'-thiobis(6-t-butyl-m-cresol),
4,4'-thiobis(6-nonyl-m-cresol),
4,4'-thiobis(6-dodecyl-m-cresol),
4,4'-thiobis[6-(1-methylcyclohexyl)-m-cresol],
4,4'-thiobis(2,6-di-t-butylphenol),
4,4'-thiobis(6-t-butyl-o-cresol),
4,4'-thiobis(6-nonyl-o-cresol),
4,4'-thiobis[2,6-bis(1-methylheptadecyl)phenol]
4,4'-thiobis[6-(1-methylheptadecyl)-o-cresol],
condensation products of p-alkylated phenols and $SCl_2$, etc.

The phenyl salicylate component of the present stabilizer combinations likewise can be widely varied, and includes phenyl salicylates having the following formula:

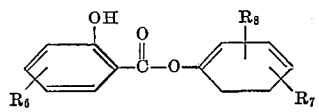

wherein $R_6$, $R_7$ and $R_8$ are hydrogen atoms or hydrocarbon radicals having 1 to 22 carbon atoms including benzyl radicals, cyclohexyl radicals, 1-alkylbenzyl radicals, 1-alkylcyclohexyl radicals, or more usually alkyl radicals having 1 to 22 carbon atoms. Preferred substituted phenyl salicylates that can be utilized include those wherein $R_6$ and $R_8$ are hydrogen atoms and $R_7$ is an alkyl radical having 8 to 18 carbon atoms, examples of which are described in the copending application by Addleburg, Lappin and Rouse, U.S. application No. 775,336, Nov. 21, 1958, now U.S. Patent 3,043,797. Illustrative phenyl salicylates of the invention include:

phenyl salicylate,
p-t-butylphenyl salicylate,
n-octylphenyl salicylate,
(1,1,3,3,-tetramethylbutyl)phenyl salicylate,
(2,2-dimethylhexyl)phenyl salicylate,
n-nonylphenyl salicylate,
(1,1,3,3-tetramethylamyl)phenyl salicylate
(1,1-dimethylheptyl)phenyl salicylate,
n-decylphenyl salicylate,
(2,2-dimethyloctyl)phenyl salicylate,
n-tetradecylphenyl salicylate,
n-pentadecylphenyl salicylate,
octadecylphenylsalicylate,
dodecylphenyl salicylate,
(1-methylheptadecyl)phenyl salicylate,
(2,2-dimethyldodecyl)phenyl salicylate,
t-butylphenyl 5-t-butyl salicylate,
t-octylphenyl 5-t-butyl salicylate,
t-octylphenyl 5-dodecyl salicylate,
octadecylphenyl 5-t-butyl salicylate,
octadecylphenyl 5-octyl salicylate,
octadecylphenyl 5-octadecyl salicylate,
1-methylheptadecylphenyl 5-(1-methylheptadecyl) salicylate,
o,o'-dimethylphenyl salicylate,
o,o'-dimethylphenyl 5-t-butyl salicylate,
o,o'-bis(octadecyl)phenyl salicylate,
o,o'-bis(octadecyl)phenyl 5-octyl salicylate,
o,o'-bis(octadecyl)phenyl 5-(1-methylheptadecyl) salicylate,
o,p-dimethylphenyl salicylate,
o,p-dimethylphenyl 5-t-butyl salicylate,
o,o'-bis(1-methylheptadecyl)phenyl salicylate,
and the like.

The combination of the described diesters of thiodialkanoic acid, thiobisphenols and phenyl salicylates can be used to stabilize a wide variety of solid poly-α-olefin compositions against deterioration resulting from exposure to elevated temperatures. Any of the normally solid polymers of α-monoolefinic aliphatic hydrocarbons containing 2 to 10 carbon atoms can be stabilized in accordance with the invention. The subject stabilizer combinations are preferably used in polypropylene, although such poly-α-olefins as polyethylene, poly(butene-1), poly(3-methylbutene-1), poly(4-methylpentene-1), poly(pentene-1), poly(3,3-dimethylbutene-1), poly(4,4-dimethylbutene-1), poly(octene-1), poly(decene-1) and the like can also be stabilized with the subject stabilizer combinations. Both the so-called "low density" and "high density" or high crystallinity poly-α-olefin compositions can be stabilized in accordance with the invention. Likewise, the poly-α-olefin compositions of the invention include polymers such as described by Hagemeyer et al. in copending applications U.S. Ser. No. 152,001, filed Nov. 13, 1961, U.S. Ser. Nos. 156,974-5, filed Dec. 4, 1961. In such polymers at least 80% by weight thereof comprises a polymer of an α-monoolefinic aliphatic hydrocarbon having 2 to 10 carbon atoms as described above, the remainder being another of such polymers (e.g. polypropylene polymerized with a small amount of ethylene), or a polymer of a diolefinic aliphatic hydrocarbon having 4 to 10 carbon atoms (e.g. polypropylene polymerized with a small amount of butadiene, isoprene, tetramethylbutadiene, etc.), or a polymer of an acetylenic aliphatic hydrocarbon having 3 to 10 carbon atoms (e.g. polypropylene polymerized with a small amount of acetylene). The stabilizer combinations of the invention are especially useful for stabilizing the solid resinous poly-α-olefins having average molecular weights of at least 15,000 and more usually at least 20,000, although the stabilizer combinations of the invention can also be utilized to stabilize the so-called poly-α-olefin waxes having lower average molecular weights of usually 3,000 to 12,000.

The amount of the combination of the diester of thiodialkanoic acid, the thiobisphenol and the phenyl salicylate employed in poly-α-olefin compositions in accordance with the invention can be widely varied, the stabilizing amount of this combination usually varying with the particular use to which the poly-α-olefin compositions are to be put. Concentrations of about .001% to 10% and generally about .001% to 5% for each component of the stabilizer combinations are used, with about .01% to 3% being preferred, the concentration being based on the weight of the poly-α-olefin. These concentrations expressed as weight ratios of each of the thiobisphenol and of the phenylsalicylate to the diester of thioalkanoic acid are about 10,000:1 to 1:10,000 and generally about 5000:1 to 1:5000 with about 300:1 to 1:300 being preferred.

The stabilizer combinations of the invention can be incorporated or blended into poly-α-olefin compositions by the conventional methods utilized for blending such materials into resins or plastics. Typical of such methods that can be suitably employed include milling on heated rolls, deposition from solvents, and dry blending. The stabilizers of the invention can be incorporated separately or together into the poly-α-olefin compositions.

The stabilizer combinations of the present invention lend to poly-α-olefin compositions improved stability, and more particularly, improved stability against oxidative deterioration resulting from exposure to elevated temperatures. In addition, poly-α-olefin compositions containing the stabilizer combinations of the invention have enhanced stability against deterioration resulting from exposure to sunlight or ultraviolet light. Thus, poly-α-olefins stabilized in accordance with the invention have an extended life expectancy and can be used more effectively than unstabilized poly-α-olefins for a wide diversity of uses. Poly-α-olefins stabilized as described can be cast, extruded, rolled, or molded into sheets, rods, tubes, pipes, filaments, or fibers, and other shaped articles, including the widely used films of the polyesters about .5 to 100 mils in thickness. The present compositions can be used for coating paper, wire, metal foil, glass fiber fabrics, synthetic and natural textiles or fabrics and other such materials.

While phenyl salicylates are effective additives in poly-α-olefins for minimizing deterioration resulting from exposure to ultraviolet light, such additives individually do not significantly improve poly-α-olefins with respect to resistance to deterioration resulting from exposure to elevated temperatures. Similarly, combinations of phenyl salicylates and dialkyl thiodialkanoates do not significantly improve poly-α-olefins with respect to resistance to deterioration resulting from exposure to elevated temperatures. I have now found that when phenylsalicylates are added to combinations of thiobisphenols and dialkyl-3,3'-thiodialkanoates, an improved three-component synergistic stabilizer system results. The stabilizing effect with respect to thermal stability in poly-α-olefins of the stabilizer combinations of the invention is substantially greater than the additive effect of the individual components of such stabilizer combinations. To the poly-α-olefin compositions of the invention can also be added minor proportion amounts, usually about .001% to 10% and preferably about .001% to 5% by weight based on the poly-α-olefin, of zinc stearate, calcium stearate, sodium stearate, or an organic phosphite, if desired. A particularly useful class of organic phosphites that can be used with the three-component stabilizer combinations of the invention are dialkyl pentaerythritol diphosphites having the formula

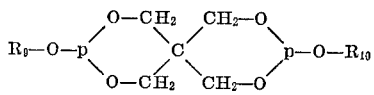

wherein $R_9$ and $R_{10}$ are alkyl radicals having 10 to 20 carbon atoms. At a concentration of about .001% to 10% by weight based on the poly-α-olefin the weight ratio of the dialkyl pentaerythritol diphosphite to the diester of thiodialkanoic acid is about in a range from 10,000:1 to 1:10,000 while at a concentration of about .001% to 5% by weight based on the poly-α-olefin the weight ratio of the dialkyl pentaerythritol diphosphite to the diester of thiodialkanoic acid is about in a range from 5000:1 to 1:5000. Such dialkyl pentaerythritol diphosphites are also useful when used in combination with the stabilizer combinations of diesters of thiodialkanoic acid plus alkylidenebisphenols plus phenyl salicylates described in my copending U.S. application No. 4,189 filed Jan. 25, 1960, now U.S. Patent 3,033,814.

The invention is illustrated by the following examples of preferred embodiments thereof. In the following examples, the stability of the poly-α-olefins was determined by an oven storage test. The poly-α-olefin under investigation is compression molded into a smooth sheet or plate. The plate is then cut into pieces weighing about 0.25 g. each. The 0.25 g. samples of the molded polymer are then placed in an air oven at 160° C. Samples are removed at intervals and each sample analyzed for peroxides. The oven storage life is the time required for initial peroxide formation in a sample of the polymer. To determine peroxide formation in the oven-exposed samples, each 0.25 g. sample in question is dissolved or suspended in 20 ml. of carbon tetrachloride and allowed to digest for 25 minutes. To this is added 20 ml. of a mixture consisting of 60% glacial acetic acid from 40% chloroform, and then 1.0 ml. of a saturated aqueous solution of potassium iodide. The resulting mixture is allowed to react for two minutes, 100 ml. of water is added to dilute the mixture, and then a starch indicator is added. The resulting mixture is then backtitrated with 0.002 N sodium thiosulfate. The peroxide concentration, P, in milliequivalents per kilogram of polymer is given by the expression $P=8S$, where S is the number of milliliters of 0.002 N sodium thiosulfate used.

EXAMPLE 1

Samples of powdered polypropylene were mixed with several stabilizer combinations of the invention as well as with subcombinations and individual stabilizers comprising such stabilizer combinations of the invention, compression molded into plates 1/16-inch in thickness, and the resulting molded samples evaluated with respect to thermal stability by the 160° C. oven storage test described above. The polypropylene was a plastic grade solid polypropylene having an average molecular weight greater than 15,000, a density of 0.908, an inherent viscosity of 1.48 as determined in Tetralin at 145° C., and a melt flow of 1.27 at 190/1.38 kg. The results of the stability evaluations are summarized by the data set out in Table A below.

Table A

| Additive: | Oven life at 160° C., hours |
|---|---|
| (1) None | 0.2 |
| (2) 0.1% DLTDP (dilauryl-3,3'-thiodipropionate) | 1 |
| (3) 0.1% DSTDP (distearyl-3,3'-thiodipropionate) | 1 |
| (4) 1% OPS [p-(1,1,3,3-tetramethylbutyl)-phenylsalicylate], or "p-t-octylphenylsalicylate" | <1 |
| (5) 1% OPBS (p-t-octylphenyl-5-t-butylsalicylate) | <1 |
| (6) 1% OPS+0.1% DLTDP | <2 |
| (7) 1% OPS+0.1% DSTDP | <2 |
| (8) 1% OPBS+0.1% DLTDP | <2 |
| (9) 1% OPBS+0.1% DSTDP | <2 |
| (10) 0.1% TBBMC [4,4'-thiobis(6-t-butyl-m-cresol)] | 50 |
| (11) 0.1% TBBMC+0.1% DLTDP | 325 |
| (12) 0.1% TBBMC+0.1% DLTDP+1% OPS | 450 |
| (13) 0.1% TBBMC+0.1% DLTDP+1% OPBS | 500 |
| (14) 0.1% TBBMC+0.1% DSTDP | 340 |
| (15) 0.1% TBBMC+0.1% DSTDP+1% OPS | 470 |
| (16) 0.1% TBBOC [4,4'-thiobis(6-t-butyl-o-cresol)] | 70 |
| (17) 0.1% TBBOC+0.1% DLTDP | 250 |
| (18) 0.1% TBBOC+0.1% DLTDP+1% OPS | 375 |
| (19) 0.1% TBBOC+0.1% DLTDP+1% OPBS | 420 |
| (20) 1% DHBP (4-dodecyloxy-2-hydroxybenzophenone) | <1 |
| (21) 0.1% TBBMC+0.1% DLTDP+1% DHPB | 300 |

In the above table, the "t-octyl" radical in the described additives was a 1,1,3,3-tetramethylbutyl radical. While phenylsalicylates are effective ultraviolet inhibitors in poly-α-olefins, such materials are ineffective heat-stabilizers as illustrated by the data set out above. Hence, it was unexpected when the addition of a phenylsalicylate to the combination of a dialkyl-3,3'-thiodipropionate and a thiobisphenol was found to be an outstanding stabilizer combination in poly-α-olefins against thermal degradation. Such was particularly unexpected in view of the fact that the combinations of phenylsalicylates and a dialkyl-3,3'-thiodipropionate are ineffective heat-stabilizers. Similar synergism as that demonstrated in Table A is also demonstrated if plastic grade solid polyethylene having an average molecular weight greater than 15,000, a density of 0.91 and a melt index of 7.59 is substituted for the polypropylene as the poly-α-olefin. Items 20 and 21 in Table A were included to illustrate that the well-known stabilizer, 4-dodecyloxy-2-hydroxybenzophenone does not exhibit the same synergistic effect when used in combination with the present dialkyl-3,3'-thiodipropionates and bisphenols as do the present phenylsalicylates (e.g. compare item 21 with items 11, 12, and 13 of Table A).

EXAMPLE 2

Combinations of the invention in poly(butene-1) were evaluated with respect to thermal stability by the 160° C. oven storage test method described in Example 1. The poly(butene-1) was a plastic grade solid poly(butene-1) having an average molecular weight greater than 15,000 and an inherent viscosity of 1.9 as determined in Tetralin at 142° C. The results of the test are summarized by the data set out in Table B below.

Table B

| Additive: | Oven life at 160° C., hours |
|---|---|
| (1) None | 0.5 |
| (2) 0.1% DLTDP (dilauryl-3,3'-thiodipropionate) | 1 |
| (3) 1.0% OPS [p-(1,1,3,3-tetramethylbutyl) salicylate] | <2 |
| (4) 0.1% TBBMC [4,4'-thiobis(6-t-butyl-m-cresol)] | <10 |
| (5) 0.1% DLTDP+1.0% OPS | <3 |
| (6) 0.1% DLTDP+0.1% TBBMC | 175 |
| (7) 0.1% DLTDP+0.1% TBBMC+1.0% OPS | 210 |
| (8) 0.1% DSPDP (distearylpentaerythritol diphosphite) | <1 |
| (9) 0.1% DLTDP+0.1% TBBMC+1.0% OPS+0.1% DSPDP | 250 |

EXAMPLE 3

Combinations of the invention in plastic grade solid polyproplene having an average molecular weight greater than 15,000, an inherent viscosity of 1.75 as determined in Tetralin at 145° C. and a melt flow of 4.5 at 230° C./2.16 kg. were evaluated with respect to thermal stability by the 160° C. oven storage test method described in Example 1. The results of the test are summarized by the data set out in Table C below.

Table C

| Additive: | Oven life at 160° C., hours |
|---|---|
| (1) None | 0.3 |
| (2) 0.1% DLTDP (dilauryl-3,3'-thiodipropionate) | <2 |
| (3) 1.0% OPS [p-(1,1,3,3-tetramethylbutyl)phenylsalicylate] | <2 |
| (4) 0.1% TBBMC [4,4'-thiobis(6-t-butyl-m-cresol)] | <12 |
| (5) 0.1% DLTDP+1.0% OPS | <3 |
| (6) 0.1% DLTDP+0.1% TBBMC | 200 |
| (7) 0.1% DLTDP+0.1% TBBMC+1.0% OPS | 260 |
| (8) 0.1% DSPDP (distearylpentaerythritol disphosphite) | <2 |
| (9) 0.1% DLTDP+0.1% TBBMC+1.0% OPS+0.1% DSPDP | 310 |

EXAMPLE 4

Combinations of the invention in a copolymer of propylene/butene-1 (90/10) were evaluated with respect to thermal stability by the 160° C. oven storage test method described in Example 1. The copolymer of propylene and butene-1 was a plastic grade solid polymer having an average molecular weight greater than 15,000 and an inherent viscosity of 2.6 as determined in Tetralin at 145° C. The results of the test are summarized by the data set out in Table D below.

Table D

| Additive: | Oven life at 160° C., hours |
|---|---|
| (1) None | 0.2 |
| (2) 0.1% DLTDP (dilauryl-3,3'-thiodipropionate) | 1 |
| (3) 1.0% OPS [p-(1,1,3,3-tetramethylbutyl)phenylsalicylate] | <2 |
| (4) 0.1% TBBMC [4,4'-thiobis(6-t-butyl-m-cresol)] | <10 |
| (5) 0.1% DLTDP+1.0% OPS | <4 |
| (6) 0.1% DLTDP+0.1% TBBMC | 125 |
| (7) 0.1% DLTDP+0.1% TBBMC+1.0% OPS | 180 |
| (8) 0.1% DSPDP (distearylpentaerythritol diphosphite) | <1 |
| (9) 0.1% DLTDP+0.1% TBBMC+1.0% OPS+0.1% DSPDP | 235 |

EXAMPLE 5

Combinations of the invention in plastic grade polypropylene having an average molecular weight greater than 15,000, an inherent viscosity of 1.96 as determined in Tetralin at 145° C. and a density of 0.91 were evaluated with respect to thermal stability by the 160° C. oven storage test method described in Example 1. The results of the test are summarized by the data set out in Table E below.

Table E

| Additives in polypropylene: | Oven life at 160° C., hours |
|---|---|
| (1) Control, unstabilized | 0.3 |
| (2) 0.1% DLTDP (dilauryl 3,3'-thiodipropionate) | <3 |
| (3) 0.1% DLTDB (dilauryl 4,4'-thiodibutyrate) | <3 |
| (4) 1% OPS [p-(1,1,3,3-tetramethylbutyl)phenylsalicylate] | <2 |
| (5) 1% ODPS (p-octadecylphenylsalicylate) | <3 |
| (6) 0.1% 4,4'-thiobis(6-nonyl-m-cresol) | <15 |
| (7) 0.1% 4,4'-thiobis[6-(1-methylheptadecyl)-m-cresol] | <15 |
| (8) 0.1% condensation product (3 parts p-nonylphenol and 2 parts SCl₂) | <15 |
| (9) 0.1% DLTDP+0.1% 4,4'-thiobis(6-nonyl-m-cresol) | 160 |
| (10) Item No. 9+1% OPS | >220 |
| (11) Item No. 9+1% ODPS | >220 |
| (12) 0.1% DLTDB+0.1% 4,4'-thiobis(6-nonyl-m-cresol) | 170 |
| (13) 0.1% DLTDB+0.1% 4,4'-thiobis(6-nonyl-m-cresol)+1% OPS | >220 |
| (14) 0.1% DLTDP+0.1% 4,4'-thiobis[6-(1-methylheptadecyl)-m-cresol] | 180 |
| (15) Item No. 14+1% OPS | >250 |
| (16) 0.1% DLTDB+0.1% 4,4'-thiobis[6-(1-methylheptadecyl)-m-cresol] | 200 |
| (17) 0.1% DLTDB+0.1% 4,4'-thiobis[6-(1-methylheptadecyl)-m-cresol]+1% OPS | >250 |
| (18) 0.1% DLTDP+1% condensation product (3 parts p-nonylphenol and 2 parts SCl₂) | 150 |
| (19) Item No. 18+1% OPS | >220 |
| (20) 0.1% DLTDB+0.1% condensation product (3 parts p-nonylphonel and 2 parts SCl₂)+1% OPS | >220 |

The details of the preparation of the condensation product of p-nonylphenol and sulfur dichloride are set out in Example 7 below.

EXAMPLE 6

Combinations of the invention in a plastic grade propylene-isoprene polymer having an average molecular weight greater than 15,000, an inherent viscosity of 1.8 as determined in Tetralin at 145° C. and a density of 0.91. The results of the test data are summarized by the data set out in Table F below. The polymer substrate was polypropylene polymerized with isoprene to a polyisoprene content of .7% by weight based on the polymer.

Table F

| Additives in propylene polymers containing isoprene: | Oven life at 160° C., hours |
|---|---|
| (1) None | 0.3 |
| (2) 0.1% DLTDP (dilauryl 3,3'-thiodipropionate) | 2 |
| (3) 0.1% TBBMC [4,4'-thiobis(6-t-butyl-m-cresol)] | 20 |
| (4) 1% OPS [p-(1,1,3,3-tetramethylbutyl)phenylsalicylate] | 4 |
| (5) 1% OPS+0.1% DLTDP | 7 |
| (6) 1% OPS+0.1% TBBMC | 20 |
| (7) 0.1% TBBMC+0.1% DLTDP | 150 |
| (8) Item No. 7+1% OPS | 200 |

The amount of additive is indicated in the above tables as percent by weight of additive based on the weight of the poly-α-olefin. In the above tables the additive, 4,4'-thiobis(6-t-butyl-m-cresol), is also called "4,4'-thiobis(3-methyl-6-t-butylphenol)," the additive, 4,4'-thiobis(6-t-butyl-o-cresol), is also called "4,4'-thiobis(2-methyl-6-t-butylphenol)," the additive, 4,4'-thiobis[6-(1-methylheptadecyl-m-cresol], is also called "4,4'-thiobis[3-methyl-6-(1-methylheptadecyl)phenol]," and the additive, 4,4'-thiobis(6-nonyl-m-cresol), is also called "4,4'-thiobis(3-methyl-6-nonylphenol)."

EXAMPLE 7

The addenda of the invention having the formula

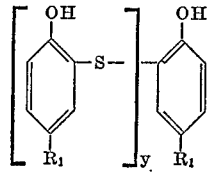

and described above, can be prepared by condensing a p-alkylphenol with sulfur dichloride and stripping off the resulting hydrogen chloride. The condensation product stabilizer addendum used in Example 5 (item 8 of Table E) can be prepared by using the typical condensation reaction described below using the appropriate amounts of reactants in place of ones reported here.

Condensation of p-cresol with sulfur dichloride.—A solution of 10.8 g. (0.1 mole) of p-cresol in 500 ml. of hexane was heated to about 50° C. To it was added dropwise over 30 minutes a solution of 9.2 g. (0.09 mole) of sulfur dichloride in 25 ml. of hexane. The resulting mixture was reuuxed for 1 hour, cooled and extracted with aqueous sodium bicarbonate solution. The hexane solution was then evaporated to give 12 g. of viscous amber liquid.

Condensation product of p-nonylphenol with sulfur dichloride.—In a manner exactly analagous to the above reaction 20.6 g. (0.1 mole) of p-nonylphenol was condensed with 9.2 g. (0.09 mole) of sulfur dichloride to give 17 g. of viscous amber liquid.

Although the invention has been described in detail with reference to preferred embodiments thereof, it will be understood that variations and modifications can be effected within the spirit and scope of the invention as described hereinabove and as defined in the appended claims.

I claim:
1. A composition of at least one normally solid poly-α-olefin derived from mono-α-olefins, α-olefin having 2 to 10 carbon atoms, and containing a synergistic stabilizing amount of the stabilizer components
   (a) a diester of thiodialkanoic acid having the formula

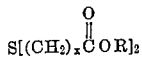

wherein R is an alkyl radical having 4 to 22 carbon atoms and x is an integer of 2 to 3,
   (b) a phenylsalicylate having the formula

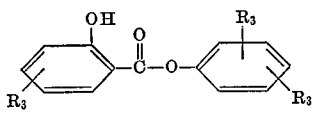

wherein $R_3$ is selected from the group consisting of hydrogen atoms and hydrocarbon radicals having 1 to 22 carbon atoms, and
   (c) a thiobisphenol having a formula selected from the group consisting of

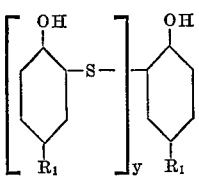

and

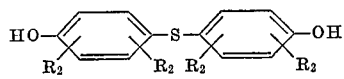

wherein $R_1$ and $R_2$ are hydrocarbon radicals having 1 to 22 carbon atoms and y is an integer of 1 to 6.
2. The composition of claim 1 wherein the weight of each stabilizer component is from about 0.001% to about 10.0% of the weight of the poly-α-olefin.
3. The composition of claim 1 wherein the poly-α-olefin is polypropylene, poly(butene-1), or a copolymer of propylene and butene-1.
4. The composition of claim 1 wherein the stabilizer components are
   (a) about .01% to 3% by weight based on said poly-α-olefin of dilauryl-3,3'-thiodipropionate or distearyl-3,3'-thiodipropionate,
   (b) about .01% to 3% by weight based on said poly-α-olefin of p-t-octylphenylsalicylate, p-t-octylphenyl-5-t-butylsalicylate or p-octyldecylphenylsalicylate,
   (c) about .01% to 3% by weight based upon said poly-α-olfin of 4,4'-thiobis(6-t-butyl-m-cresol), 4,4',-thiobis-(6-nonyl-m-cresol) or 4,4'-thiobis[6(1-methylheptadecyl)-m-cresol].
5. The composition of claim 4 wherein the stabilizer components additionally include
   (d) A dialkyl pentaerythritol diphosphite having the formula

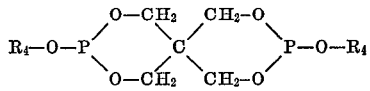

wherein $R_4$ is an alkyl radical having 10 to 20 carbon atoms.
6. A stabilizer combination comprising together the components
   (a) a diester of thiodialkanoic acid having the formula

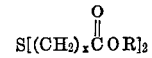

wherein R is an alkyl radical having 4 to 22 carbon atoms and x is an integer of 2 to 3,
   (b) a phenylsalicylate having the formula

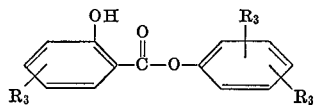

wherein $R_3$ is selected from the group consisting of hydrogen atoms and hydrocarbon radicals having 1 to 22 carbon atoms, and
   (c) a thiobisphenol having a formula selected from the group consisting of

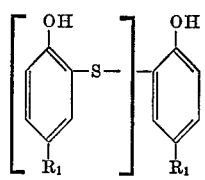

and

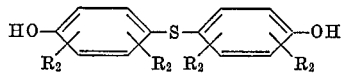

wherein $R_1$ and $R_2$ are hydrocarbon radicals having 1 to 22 carbon atoms and y is an integer of 1 to 6, the weight ratio of said thiobisphenol to said diester being in a range from 10,000:1 to 1:10,000 and the weight ratio of said phenylsalicylate to said diester being in a range from 10,000:1 to 1:10,000.
7. A stabilizer combination according to claim 6 wherein the weight ratio of said thiobisphenol to said diester is in a range from 5000:1 to 1:5000 and the weight ratio of said phenylsalicylate to said diester is in a range from 5000:1 to 1:5000.
8. The stabilizer combination of claim 6 wherein the components are
   (a) dilauryl - 3,3' - thiodipropionate or distearyl - 3,3'-thiodipropionate,
   (b) p - t - octylphenylsalicylate, p - t - octylphenyl-5-t-butyl-salicylate, or p-octyldecylphenylsalicylate, and
   (c) 4,4' - thiobis(6 - t - butyl - m - cresol), 4,4' - thiobis (6 - nonyl - m - cresol) or 4,4' - thiobis[6 - (1 - methylheptedecyl)-m-cresol], the weight ratio of said phenylsalicylate to said thiodipropionate being in a range from 300:1 to 1:300 and the weight ratio of said thiobiscresol being in a range from 300:1 to 1:300.

9. A stabilizer combination comprising together
(a) a diester of thiodialkanoic acid having the formula

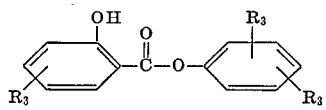

wherein R is an alkyl radical having 4 to 22 carbon atoms and $x$ is an integer of 2 to 3,
(b) a phenylsalicylate having the formula

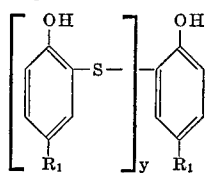

wherein $R_3$ is selected from the group consisting of hydrogen atoms and hydrocarbon radicals having 1 to 22 carbon atoms.
(c) a thiobisphenol having a formula selected from the group consisting of

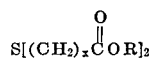

and

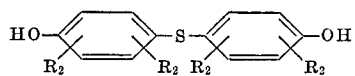

wherein $R_1$ and $R_2$ are hydrocarbon radicals having 1 to 22 carbon atoms and $y$ is an integer of 1 to 6, and
(d) a dialkyl pentaerythritol diphosphate having the formula

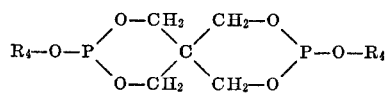

wherein $R_4$ is an alkyl radical having 10 to 20 carbon atoms, the weight ratio of said thiobisphenol to said diester being in a range from 10,000:1 to 1:10,000, the weight ratio of said phenylsalicylate to said diester being in a range from 10,000:1 to 1:10,000 and the weight ratio of said diphosphite being in a range from 10,000:1 to 1:10,000.

10. A stabilizer combination according to claim 9 wherein the weight ratio of said thiobisphenol to said diester is in a range from 5000:1 to 1:5000, the weight ratio of said phenylsalicylate to said diester is in a range from 5000:1 to 1:5000 and the weight ratio of said diphosphite is in a range from 5000:1 to 1:5000.

References Cited

UNITED STATES PATENTS

| | | | |
|---|---|---|---|
| 2,984,645 | 5/1961 | Hoeschele | 260—45.95 |
| 2,985,617 | 5/1961 | Salyer et al. | 260—45.95 |
| 3,033,814 | 5/1962 | Thalstrup | 260—45.85 |
| 3,039,993 | 6/1962 | Friedman | 260—45.8 |

FOREIGN PATENTS 582,162  12/1959  Belgium.

OTHER REFERENCES

Neureiter, et al.: Synergism Between Phenols and Sulfides, vol. 1, No. 4, December 1962, Industrial and Eng. Chem. Prod. Research and Development, p. 238 relied upon.

DONALD E. CZAJA, *Primary Examiner.*

H. E. TAYLOR, *Assistant Examiner.*

U.S. Cl. X.R.

117—128.4, 132, 218; 252—404, 406, 407; 260—45.95, 45.85